US008401718B2

(12) United States Patent
Rashid et al.

(10) Patent No.: US 8,401,718 B2
(45) Date of Patent: Mar. 19, 2013

(54) METHOD OF AND SYSTEM FOR MAINTAINING OPERATING PERFORMANCE OF A TRANSPARENCY

(75) Inventors: Ali N. Rashid, Covington, KY (US); Monroe A. Stone, Gurley, AL (US); James F. Priddy, Huntsville, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/420,693

(22) Filed: Mar. 15, 2012

(65) Prior Publication Data

US 2012/0173438 A1 Jul. 5, 2012

Related U.S. Application Data

(63) Continuation of application No. 12/345,932, filed on Dec. 30, 2008, now Pat. No. 8,155,816.

(51) Int. Cl.
*G06F 19/00* (2006.01)

(52) U.S. Cl. ......... 701/3; 701/29.1; 701/29.3; 701/31.4; 701/31.5; 701/34.4; 701/32.7

(58) Field of Classification Search ............. 701/3, 29.1, 701/29.3, 31.4, 31.5, 32.7, 34.4
See application file for complete search history.

(56) References Cited

U.S. PATENT DOCUMENTS 4,078,107 A 3/1978 Bitterice et al.
4,610,771 A 9/1986 Gillery
4,621,249 A 11/1986 Uchikawa et al.
4,623,389 A 11/1986 Donley et al.
4,793,175 A 12/1988 Fedter et al.
4,806,220 A 2/1989 Finley
4,894,513 A 1/1990 Koontz
4,902,875 A 2/1990 Koontz
4,994,650 A 2/1991 Koontz
5,028,906 A 7/1991 Moriya et al.
5,675,944 A 10/1997 Kerr et al.
5,821,001 A 10/1998 Arbab et al.
5,965,853 A 10/1999 Hornsey
6,535,126 B2 * 3/2003 Lin et al. ....................... 340/550
6,794,882 B2 * 9/2004 Jessup .......................... 324/522
RE39,618 E * 5/2007 Levine ......................... 701/29.6
7,586,664 B2 9/2009 O'Shaughnessy
8,155,816 B2 4/2012 Rashid et al.
2007/0002422 A1 1/2007 O'Shaughnessy
2007/0225881 A1 * 9/2007 McAndrew et al. ............ 701/29
2008/0004788 A1 * 1/2008 Dorfstatter et al. ........... 701/117
2008/0126111 A1 * 5/2008 Loda ................................ 705/1
2008/0191841 A1 * 8/2008 Fourreau ...................... 340/10.1
2008/0208397 A1 * 8/2008 Miklos ............................. 701/3
2010/0163675 A1 7/2010 Rashid et al.

* cited by examiner

*Primary Examiner* — Ruth Ilan
(74) *Attorney, Agent, or Firm* — Andrew C. Siminerio

(57) ABSTRACT

Repair or replacement of a transparency mounted in body of a vehicle, e.g. an aircraft when one or more properties of the transparency is (are) operating outside of an acceptable limit (s) is arranged by monitoring operating performance of a property of the transparency, e.g. by mounted a sensor, e.g. a sensor for detecting moisture; a sensor for detecting impacts and vibrations; a sensor for detecting fractures; a sensor for detecting electric arcing, and a sensor for measuring temperature of an electrically conductive coating, on the transparency. Scheduling repair or replacement of the transparency at a geographical area when the operating performance of the property is outside an acceptable operating performance limit, and forwarding the schedule to the vehicle and to a maintenance location to prepare for the repair or replacement of the transparency at the geographical work area.

18 Claims, 9 Drawing Sheets

47 320 314 318 328 330 322 326 324 332 330 316

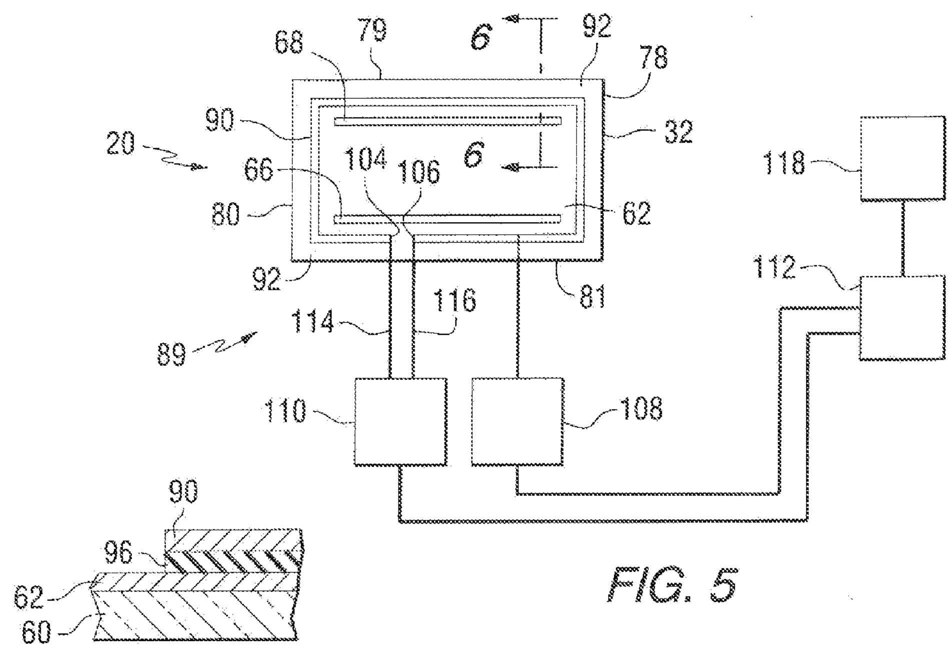
FIG. 5
FIG. 6
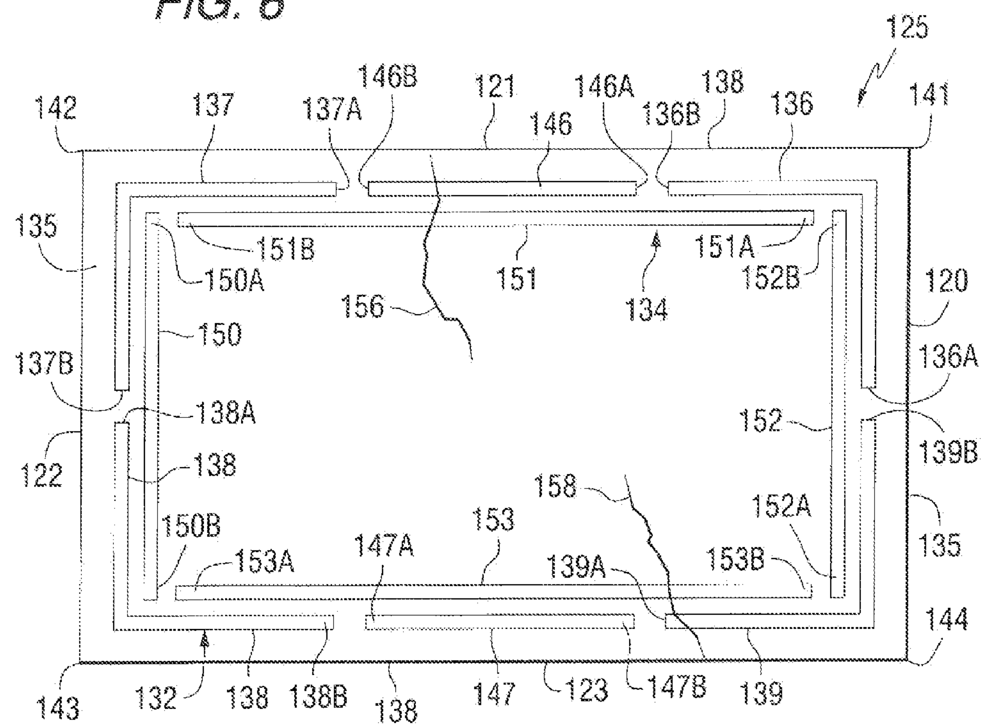
FIG. 7

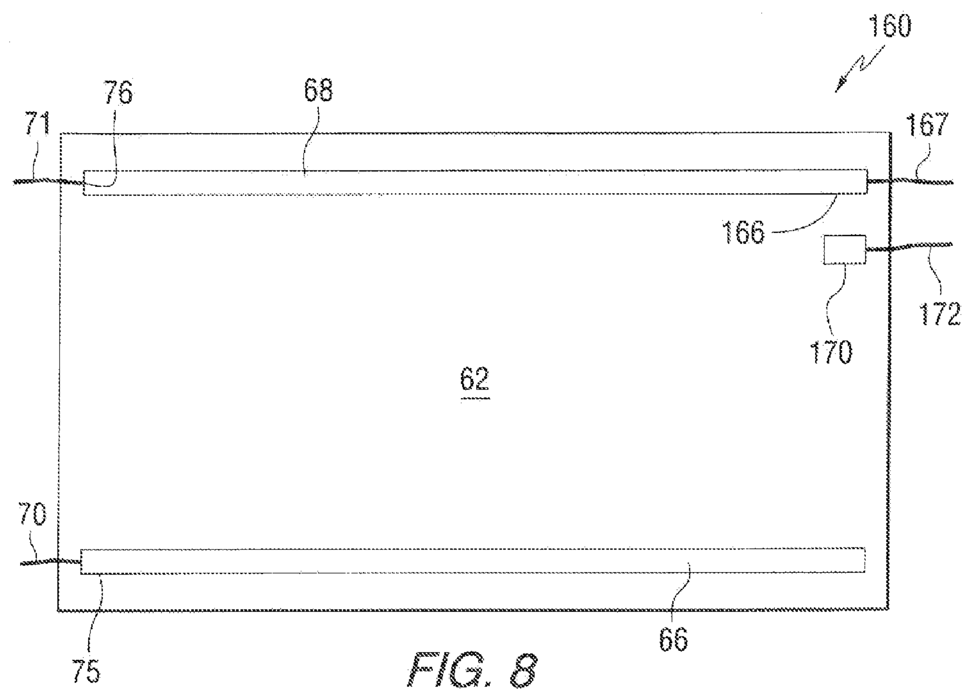
FIG. 8
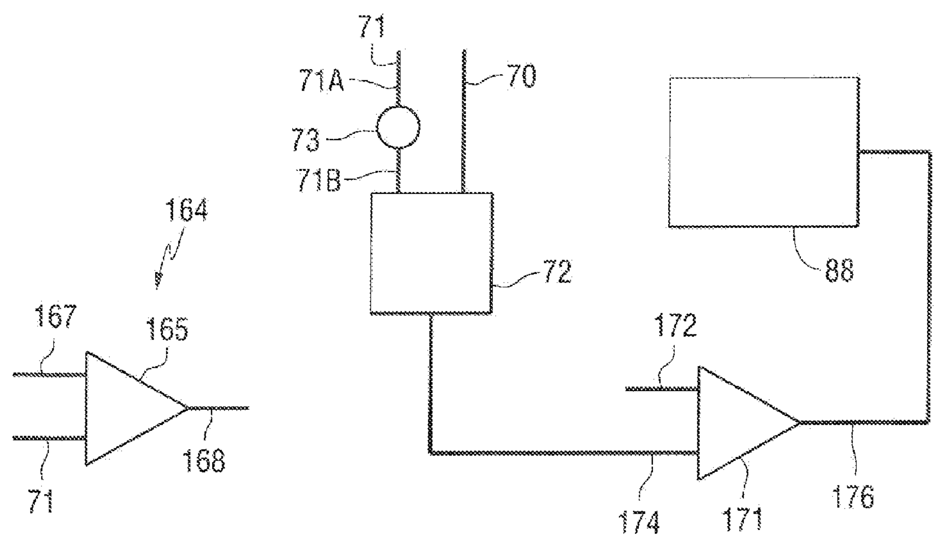
FIG. 9
FIG. 10

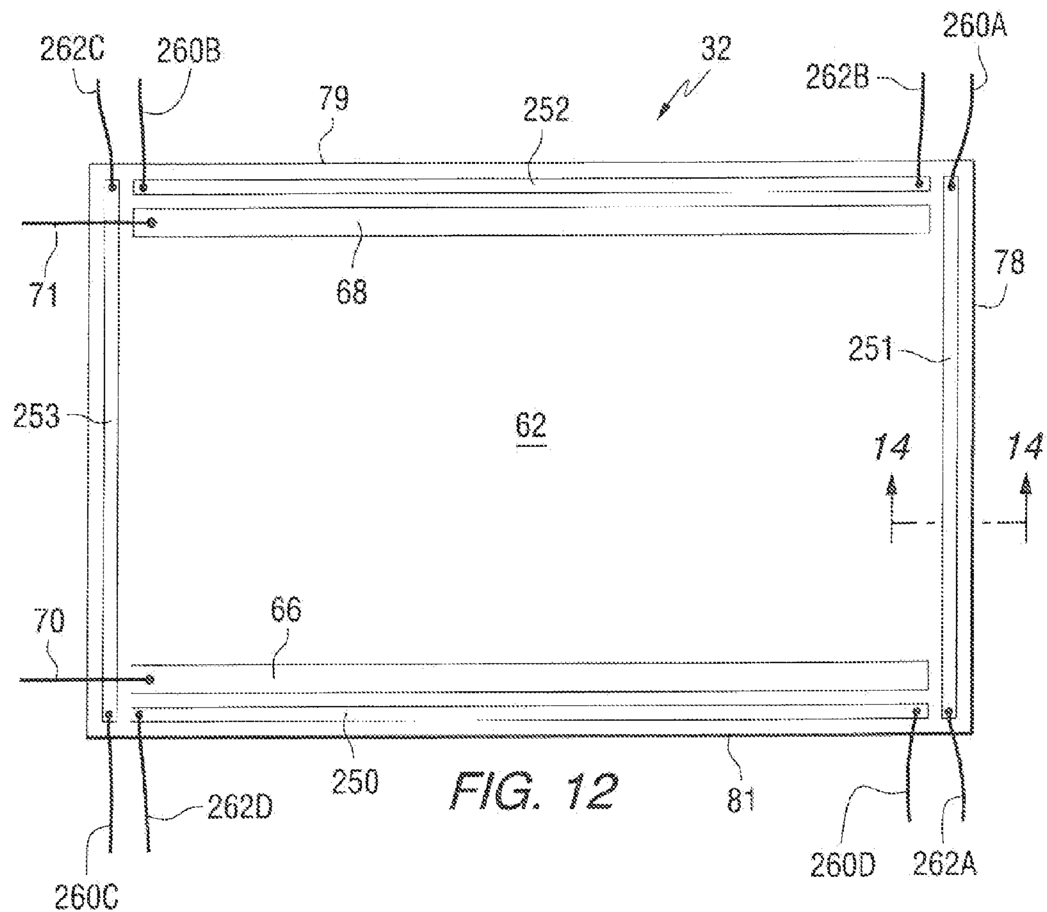
FIG. 12
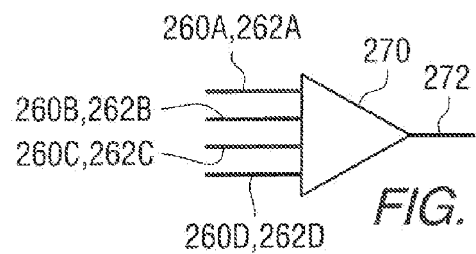
FIG. 13
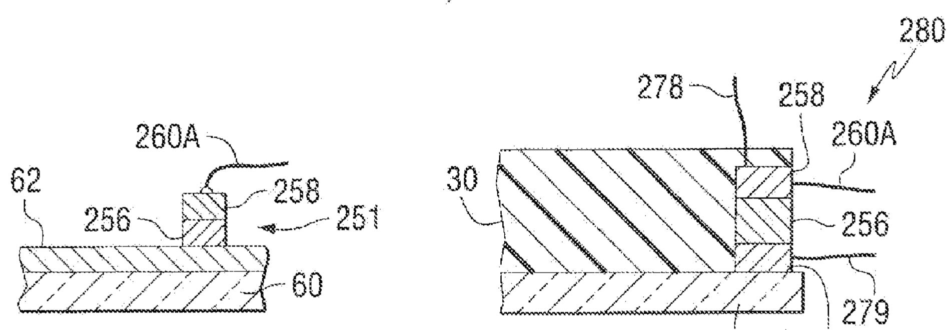
FIG. 14
FIG. 16

FIG. 18
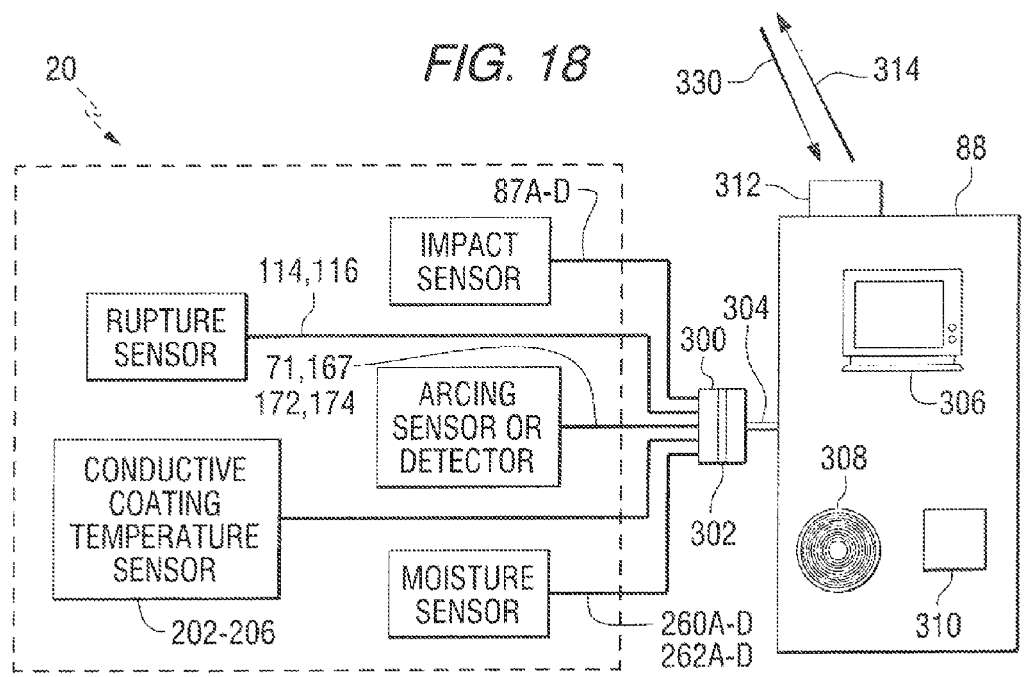
FIG. 18A
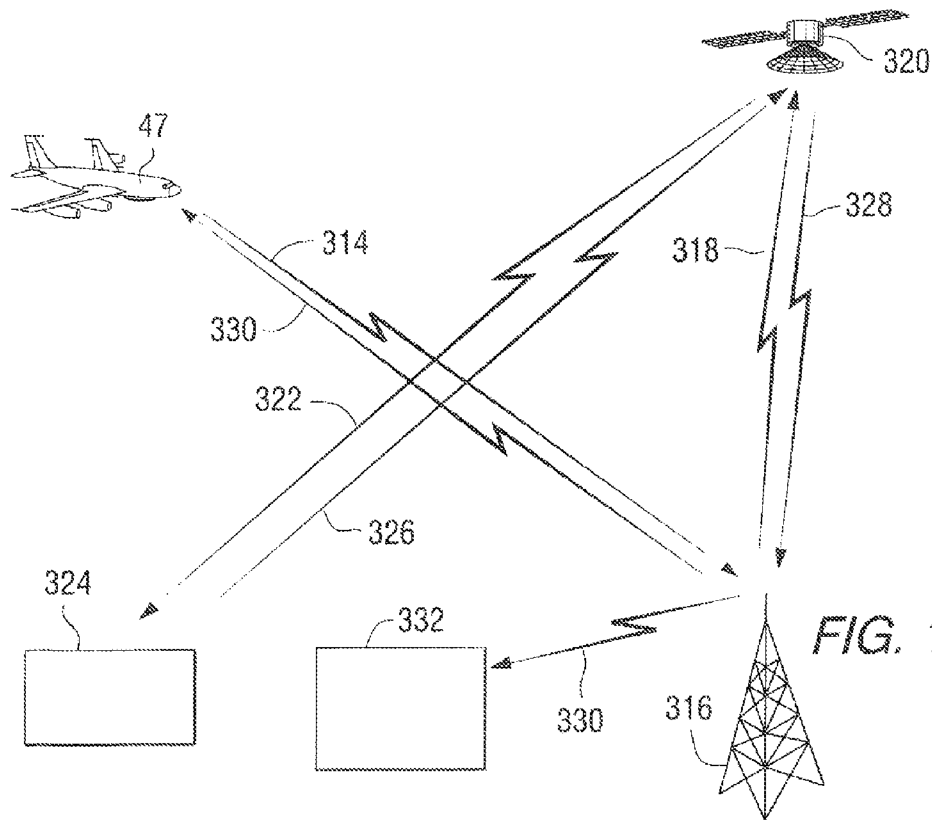
FIG. 18B

METHOD OF AND SYSTEM FOR MAINTAINING OPERATING PERFORMANCE OF A TRANSPARENCY

CROSS-REFERENCE TO RELATED APPLICATION

This application is a continuation of U.S. patent application Ser. No. 12/345,932, filed Dec. 30, 2008, which application is related to U.S. patent application Ser. No. 12/345,952 flied Dec. 30, 2008, both of which are herein incorporated by reference in their entirety.

BACKGROUND OF THE INVENTION

1. Field of the Invention

This invention relates to a method of and a system for maintaining operating performance of a transparency, e.g. a vehicle window, and more particularly for timely and economically scheduling repair or replacement of the vehicle window, e.g. an aircraft windshield, when sensor of the windshield indicates that a property of the windshield is performing outside of an acceptable limit.

2. Discussion of the Presently Available Transparency Technology

Aircraft or aerospace windows, e.g. aircraft windshields include a laminate of plastic layers or sheets, glass layers or sheets and combinations thereof. The layers of an inner segment of the windshield face the interior of the aircraft and provide structural stability to the windshield. The outer segment of the windshield faces the exterior of the aircraft and usually includes a laminate of glass sheets. The outer segment of the windshield, which can also provide structural stability is usually provided with accessories for visual acuity. For example and not limiting to the discussion, the outer segment of the windshield can include an electrically conductive coating, or a plurality of electrically conductive wires, between and connected to a pair of spaced bus bars to heat the windshield to prevent the formation of, and/or remove fog and ice on and/or from, respectively, the outer surface of the windshield.

As is appreciated by those skilled in the art, as the service time of the aircraft windshield increases, the operating efficiency of the windshield decreases until such time that the accessories of the windshield become non-functional, and the windshield needs to be replaced or repaired. More particularly, the peripheral edge of the windshield has an outboard moisture seal that is a barrier to prevent moisture from entering between the plastic and glass layers or sheets of the windshield. When the seal fails, e.g. cracks and/or the layers de-bond due to erosion caused by wind and rain, moisture enters between the layers of the windshield. While the cracking or de-bonding of the seal is not a structural issue, when moisture reaches inside the windshield, the windshield can de-laminate, and the conductive coating or wires, whichever is present can be damaged and fail, thereby reducing the service life of the windshield. More particularly, when delamination of the windshield occurs, increased amounts of moisture move between the layers of the windshield accelerating the degradation of the windshield, e.g. damage and/or failure of the bus bars and electrically conductive coating or wires reducing or eliminating the defrosting capabilities of the windshield.

Untimely response to repair defects in the accessories of the transparency when they begin, decreases the operating efficiency of the transparency and can result in the need for emergency maintenance, e.g. transparency repair or replacement. It would be advantageous, therefore, to provide a transparency having sensors to monitor the performance of the transparency and a method of acting on the information from the sensors such that repairs, or replacements, of the transparencies is scheduled maintenance and not emergency maintenance.

SUMMARY OF THE INVENTION

This invention relates to a method of arranging repair or replacement of a transparency when a property of the transparency is operating outside of an acceptable limit, wherein the transparency is mounted in body of a vehicle, the method includes monitoring operating performance of the property of the transparency; scheduling repair or replacement of the transparency at a geographical area when the operating performance of the property is outside an acceptable operating performance limit, and forwarding the schedule to the vehicle and to a maintenance location to prepare for the repair or replacement of the transparency at the designated geographical work area.

The invention further relates to a system for arranging repair to, or replacement of, a transparency when a property of the transparency is operating outside of an acceptable limit, wherein the transparency is mounted in body of a vehicle. The system includes, among other things, a sensor to monitor operating performance of the property, and to generate a first signal providing the operating performance of the property, and data processing equipment to receive the information of the first signal, and to generate a second signal scheduling repair or replacement of the transparency at a geographical area when the operating performance as indicated by the first signal is outside an acceptable operating performance limit, wherein the second signal is forwarded to the vehicle and to a maintenance location to prepare for repair or replacement of the transparency.

BRIEF DESCRIPTION OF THE DRAWINGS

FIG. 5 is a schematic view of a non-limiting embodiment of a rupture sensor or detector of the invention.

FIG. 6 is a view taken along lines 6-6 of FIG. 5.

FIG. 7 is a plan view of another non-limiting embodiment of a rupture sensor or detector of the invention.

FIG. 8 is a plan view of non-limiting embodiment of a sensor or detector to monitor the temperature of the electrically conductive member of a heating arrangement in accordance to the teachings of the invention.

FIG. 9 is a non-limiting embodiment of an electrical system to monitor and act on the output signals of the sensor shown in FIG. 8 in accordance to the teachings of the invention.

FIG. 10 is a non-limiting embodiment of an electrical system of the invention for measuring the voltage output of a bus bar of the heating arrangement shown in FIG. 8 to monitor the temperature of the electrically conductive member of the heating arrangement in accordance to the teachings of the invention.

FIG. 12 is a plan view of a non-limiting embodiment of a moisture sensor or detector positioned over the electrically conductive member of a heating arrangement in accordance to the teachings of the invention.

FIG. 13 is a non-limiting embodiment of an electrical system for monitoring the output of the moisture sensors shown in FIG. 12 in accordance to the teachings of the invention.

FIG. 14 is a view taken along lines 14-14 of FIG. 12.

FIG. 16 is a view similar to the view of FIG. 14 showing another non-limiting embodiment of a moisture sensor or detector on a sheet of the windshield shown in FIG. 2 in accordance to the teachings of the invention.

FIG. 18 includes FIGS. 18A and 188. FIG. 18A is a non-limiting embodiment of a schematic of a system of the invention for monitoring the output signals of sensors or detectors in accordance to the teachings of the invention to monitor the real time performance of features, properties, or characteristics of accessories that provide the aircraft transparency with visual acuity, and FIG. 18B is a schematic of a system for scheduling repairs to, or replacements of, aircraft transparencies that the signals of the sensors or detectors indicate are performing outside of acceptable limits.

DETAILED DESCRIPTION OF THE INVENTION

Figure 1:
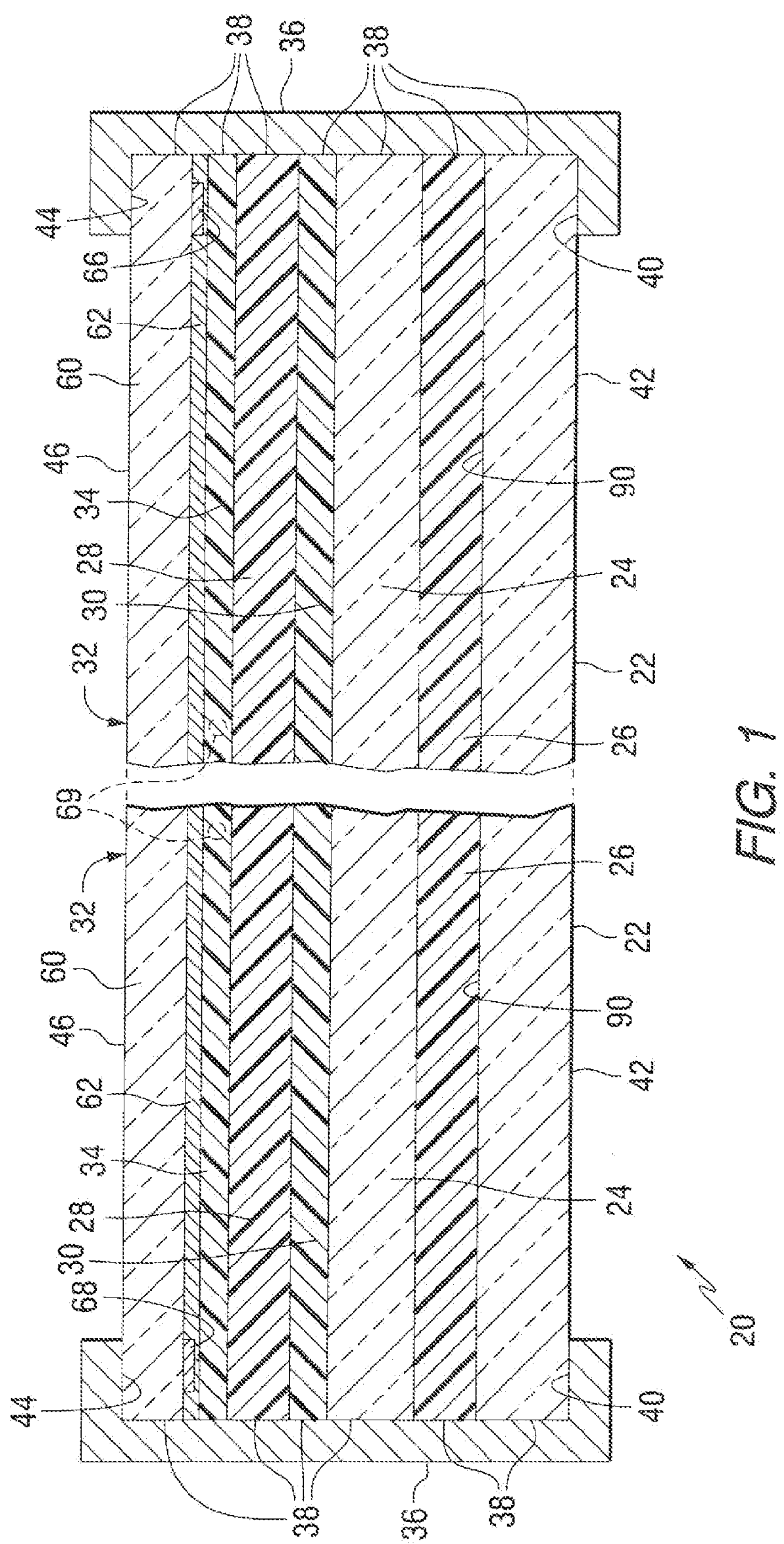
FIG. 1 is a cross sectional view of a non-limiting embodiment of an aircraft windshield used in the practice of the invention.

As used herein, spatial or directional terms such as “inner”, “outer”, “left”, “right”, “up” “down”, “horizontal”, “vertical”, and the like, relate to the invention as it is shown in the drawing on the figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term “about”. Accordingly, unless indicated to the contrary, the numerical values set forth in the following specification and claims can vary depending upon the property desired and/or sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of “1 to 10” should be considered to include any and all subranges between and inclusive of the minimum value of 1 and the maximum value of 10; that is, all subranges beginning with a minimum value of 1 or more and ending with a maximum value of 10 or less, e.g., 1 to 67, or 3.2 to 8.1, or 5.5 to 10. Also, as used herein, the term “positioned over” or “mounted over” means positioned on or mounted over but not necessarily in surface contact with. For example, one article or component of an article “mounted over or positioned over” another article or component of an article does not preclude the presence of materials between the articles, or between components of the article, respectively.

Before discussing several non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

Non-limiting embodiments of the invention will be directed to an aircraft laminated transparency, and in particular to an aircraft windshield; the invention, however, is not limited to any particular type of aircraft transparency, and the invention contemplates the practice of the invention on aircraft windows of the type having a medium responsive to electric stimuli to increase or decrease visible transmission, e.g. but not limited to the type of window disclosed in U.S. Published Patent application 2007/0002422A1 and on aircraft windows of the type having an insulated air space between a pair of laminated sheets. The entire disclosure of the publications is hereby incorporated by reference. Further, the invention can be practiced on commercial and residential windows, e.g. but not limited to type disclosed in U.S. Pat. No. 5,675,944, which patent in its entirety is hereby incorporated by reference; a window for any type of land vehicle; a canopy, cabin window and windshield for any type of air and space vehicle, a window for any above or below water vessel, and a window for a viewing side or door for any type of containers, for example but not limited to a refrigerator, cabinet and/or oven door. Still further, the invention is not limited to the material of the layers or sheets of the transparency, and the layers or sheets can be made of, but not limited to, cured and uncured plastic sheets; annealed, heat strengthened, and heat and chemically strengthened, clear, colored, coated and uncoated glass sheets. Still further the invention can be practiced on windows having opaque sheets, e.g. but not limited to wood and metal sheets, and glass sheets having an opaque coating, and combinations thereof.

Shown in FIG. 1 is a non-limiting embodiment of an aircraft windshield 20 that can be used in the practice of the invention. The windshield includes a first glass sheet 22 secured to a second glass sheet 24 by a first interlayer 26; the second sheet 24 secured to a second vinyl-interlayer or sheet 28 by a first urethane interlayer 30, and the second vinyl-interlayer 28 secured to a heatable member 32 by a second urethane interlayer 34. An edge member or moisture barrier 36 of the type used in the art, e.g. but not limited to a silicone rubber or other flexible durable moisture resistant material is secured to (1) peripheral edge 38 of the windshield 20, i.e. the peripheral edge 38 of the first and second sheets 22, 24; of the first and second vinyl-interlayers 26, 28; of the first and second urethane interlayers 30, 34 and of the heatable member 32; (2) margins or marginal edges 40 of outer surface 42 of the windshield, i.e. the margins 40 of the outer surface 42 of the first glass sheet 22 of the windshield 20, and (3) margins or marginal edges 44 of outer surface 46 of the windshield 20, i.e. margins of the outer surface 46 of the heatable member 32.

As is appreciated by those skilled in the art and not limiting to the invention, the first and second glass sheets 22, 24; the first and second vinyl-interlayers 26, 28 and the first urethane interlayer 30 form the structural part, or inner segment, of the windshield 20 and the outer surface 42 of the windshield 20 faces the interior of the vehicle, e.g. an aircraft 47 (shown only in FIG. 18B), and the second urethane layer 34 and the heatable member 32 form the non-structural part, or outer segment, of the windshield 20, and the surface 46 of the windshield 20 faces the exterior of the aircraft. The heatable member 32 provides heat to remove fog from, and/or to melt ice on, the outer surface 46 of the windshield 20 in a manner discussed below.

As can be appreciated the invention is not limited to the construction of the windshield 20 and any of the constructions of aircraft transparencies used in the art can be used in the practice of the invention. For example and not limited to the invention, the windshield 20 can include a construction wherein the vinyl interlayer 28 and the urethane interlayer 30 are omitted, and/or the sheets 22 and 24 are plastic sheets.

Generally the glass sheets 22, 24 of the windshield 20 are clear chemically strengthened glass sheets; however, the invention is not limited thereto, and the glass sheets can be heat strengthened or heat tempered glass sheets. Further as is appreciated, the invention is not limited to the number of glass sheets, vinyl interlayers or urethane interlayers that make up the windshield 20 and the windshield 20 can have any number of sheets and/or interlayers.

Figure 2:
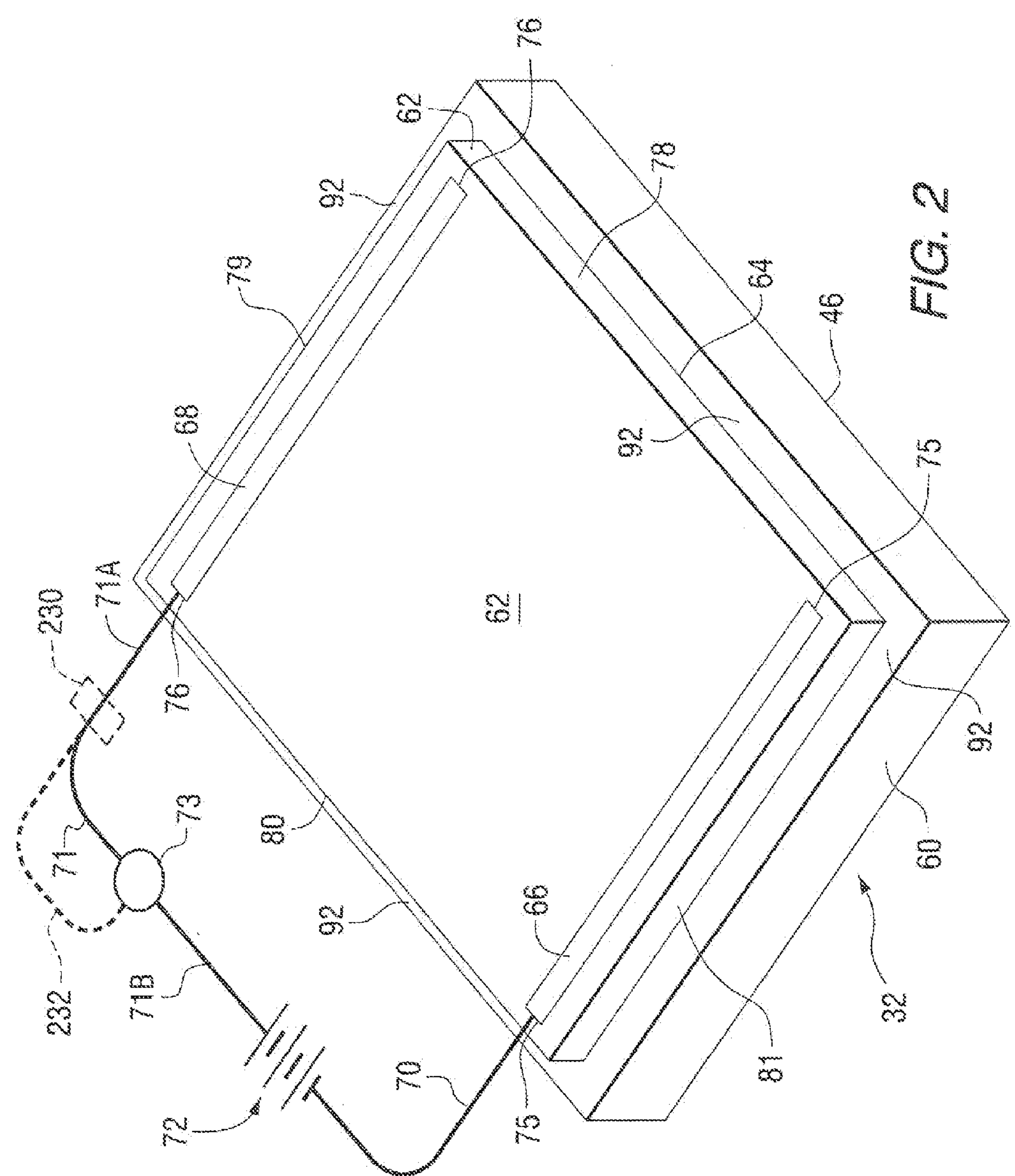
FIG. 2 is an isometric view a non-limiting embodiment of a heating arrangement of the invention.

The invention is not limited to the design and/or construction of the heatable member 32, and any electrically conductive heatable member used in the art to heat a surface of a sheet to melt ice on, and/or remove fog from the surface of the sheet can be used in the practice of the invention. With reference to FIG. 2, in one non-limiting embodiment of the invention, the heatable member 32 includes a glass sheet 60 having a conductive coating 62 applied to surface 64 of the glass sheet 60, and a pair of spaced bus bars 66, 68 in electrical contact with the conductive coating 62. The invention is not limited to the composition of the conductive coating 62, for example and not limiting to the invention the conductive coating 62 can be made from any suitable electrically conductive material. Non-limiting embodiments of conductive coatings that can be used in the practice of the invention include, but are not limited to a pyrolytic deposited fluorine doped tin oxide film of the type sold by PPG Industries, Inc. under the trademark NESA®; a magnetron sputter deposited tin doped indium oxide film of the type sold by PPG Industries, Inc under the trademark NESATRON®; a coating made up of one or more magnetron sputter deposited films, the films including, but not limited to a metal film, e.g. silver between metal oxide films, e.g. zinc oxide and/or zinc stannate, each of which may be applied sequentially by magnetron sputtering, e.g. as disclosed in U.S. Pat. Nos. 4,610,771; 4,806,220 and 5,821,001 the disclosures of which in their entirety are hereby incorporated by reference.

As can be appreciated, the invention is not limited to the use of an electrically conductive coating to heat the glass sheet 60 and contemplates the use of any type of member that can be electrically heated, e.g. but not limited to electrical conducting wires. The wires, e.g. the wires 69 shown in phantom in FIG. 1 can be embedded in the interlayer 34 and electrically connected to the bus bars 66 and 68. Such a heating arrangement is known in the art under the PPG Industries Ohio Inc, registered trademark AIRCON and is disclosed in U.S. Pat. No. 4,078,107, which patent in its entirety is incorporated herein by reference.

The invention is not limited to the design and/or construction of the bus bars and any of the types of bus bars used in the art may be used in the practice of the invention. Examples of bus bars that can be used in the practice of the invention, include, but not limited to, the types disclosed in U.S. Pat. Nos. (fired on silver ceramic glass frit); 4,623,389; 4,894,513; 4,994,650, and 4,902,875, which patents in their entirety are hereby incorporated by reference. In the preferred practice of the invention, the bus bars are fired on silver ceramic glass frit, e.g. of the type disclosed in U.S. Pat. No. 4,623,389. Each of the bus bars 66 and 68 are connected by a wire 70 and 71 respectively to a power source 72, e.g. a battery to flow current through the bus bars 66 and 68, and the conductive coating 62 to heat the conductive coating 62 and sheet 60 to remove ice and/or fog from the surface 46 of the windshield 20. An on-off switch, a rheostat or variable transformer 73 is connected to one of the wires, e.g. between the wire 71 between the positions 71A and 71B to position the rheostat between the power source 72 and the bus bar 68 to vary or regulate the current flow through the bus bars 68 and 66, and the conductive coating 62 to control the temperature of the conductive coating 62. Although not limiting to the invention, ends 75 of the bus bar 66, and ends 76 of the bus bar 68 are spaced from adjacent sides 78-81 of the glass sheet 60 to prevent arcing of the bus bars 66 and 68 with the metal body cover of the aircraft 47 (shown only in FIG. 18B).

The discussion is now directed to the placement of sensors or detectors on selected components of the windshield 20, to monitor the performance of the selected components of the windshield 20, in accordance to the teachings of the invention.

Impact Sensor

In one non-limiting embodiment of the invention, the windshield 20 is provided with an impact sensor or detector that generates a signal when an object hits or impacts the windshield, e.g. but not limiting to the invention, hits the outer surface 46 of the windshield 20. For example and not limiting to the invention, as the aircraft travels down a runway during take-off or landing, foreign objects. e.g. stones are propelled through the air and can hit the outer surface 46 of the windshield. The impact detector mounted a sheet of the windshield can be used to indicate that one or more foreign objects have hit the windshield, and optionally the location on the outer surface 46 where the hit or impact occurred and the relative energy of the impact on the surface 46 of the windshield 20.

Figure 3:
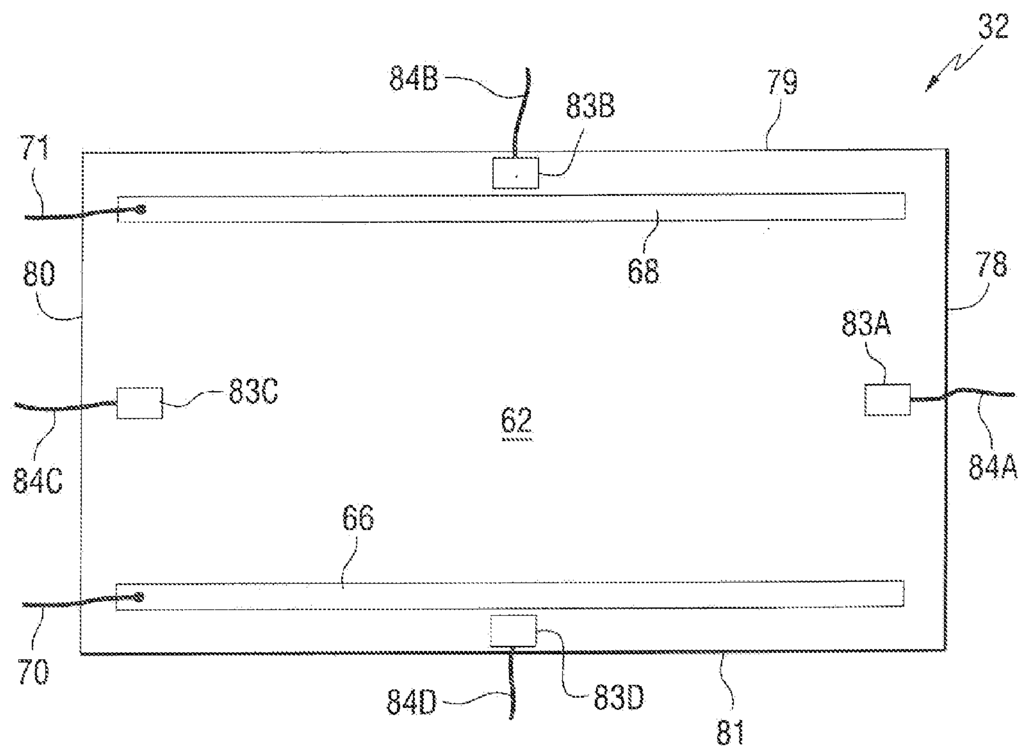
FIG. 3 is a plan view of a non-limiting embodiment of impact sensors or detectors positioned on the electrically conductive member of a heating arrangement in accordance to the teachings of the invention.

With reference to FIG. 3, in one non-limiting embodiment of the invention, one or more impact sensors or detectors (four detectors 83A, 83B 83C and 83D are shown in FIG. 3) are mounted adjacent each one of the skies 78-81 of the glass sheet 60. In this non-limiting embodiment of the invention, each of the impact detectors include a piezoelectric material, e.g. but not limited to a piezoelectric crystal. When the piezoelectric material is exposed to vibration, e.g. vibration of the glass sheet 60 (see FIGS. 1 and 2) caused by a stone hitting the outer surface 46 of the glass sheet 60, the piezoelectric material undergoes a compression or distortion and, as a result, produces an electric field, which can be used to activate or to cause an alarm and/or a recorder to be activated to announce and/or record the hit or impact. Further, using three or more impact detectors the location of the impact on the surface 46 of the windshield can be identified, as discussed below.

Figure 4:
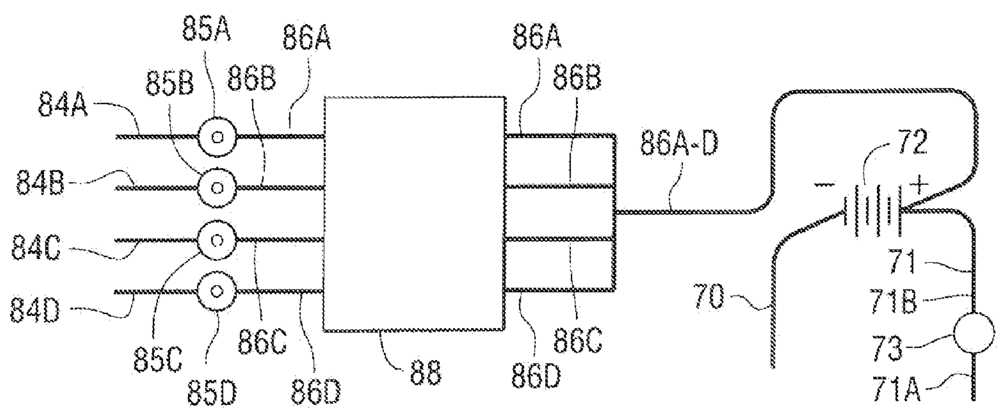
FIG. 4 is a non-limiting embodiment of an electrical system of the invention to monitor and act on output signals of the impact sensors shown in FIG. 3 in accordance to the teachings of the invention.

With reference to FIGS. 3 and 4 as needed, there is shown the heatable member 32 having one of the impact detectors 83A-D mounted adjacent one of the sides 78-81, respectively of the glass sheet 60. The detectors 83A-D are mounted on the conductive coating 62 and have one electrical contact of the detectors 83A-D electrical connected to the conductive coating 62 and the other electrical contact of each of the detectors 83A-D connected by a wire 84A-D, respectively, to a rheostat or variable transformer 85A-D, respectively. Each of the rheostats 85A-D are electrically connected to the console 88 and the positive pole of the power supply 72 by way of wires

86A-D, respectively (see FIG. 4). In this manner, the power to the detectors 83A-D is provided by the power supply 72, controlled by the rheostats 85A-D, respectively and changes in the electric field of each of the impact detectors 83A-D measured or monitored by the comparator in the console 88. As can be appreciated the invention is not limited to the manner in which power is provided to the detectors 83A-D and any circuit arrangement can be used in the practice of the invention, e.g. and not limiting to the invention one electrical contact of the detectors 83A-D can be mounted on any one or more of the sheets of the windshield and directly connected to one pole of a power supply dedicated to providing electrical power to the detectors and the other contact of the detectors 83A-D connected to the other pole of the dedicated power supply. As can be appreciated, the invention is not limited to the type of power supply used in the practice of the invention and the power supply can generate alternating or direct current.

With the arrangement shown in FIGS. 3 and 4, the piezoelectric material of the detectors 83A-D undergoes a compression or distortion when the windshield is vibrated, e.g. an object hits the outer surface 46 of the windshield 20. The vibration of the piezoelectric crystal of the detectors produces an electric field or current which is sent along one or more of wires 84A-D of the detectors 83A-D, respectively to the console 88 (see also FIG. 18A). The console 88 is provided with data processing equipment, e.g. software which analysis the signal forwarded along wires 86A-D to determine the location of the impact by triangulation of the signals from selected ones or all of the detectors 83A-D, and the magnitude of the impact, e.g. by the magnitude of the electric field, and stores the information. Electronic circuitry for electric file of impact detectors, e.g. piezoelectric crystal is well known in the art, e.g. see U.S. Pat. No. 6,535,126, which patent in its entirety is hereby incorporated by reference, and no further discussion is deemed necessary. In another non-limiting embodiment of the invention, signals from the detectors 83A-D that exceed a predetermined amount of current are displayed on the console 88 to indicate that a visual inspection of the outer surface 46 of the windshield 20 should be made, and/or the windshield repaired, e.g. at the next scheduled stop of the aircraft, and optionally can be forwarded to a control center in a manner discussed below to schedule any needed repairs.

As is appreciated, aircrafts during take-off, in-flight and landing vibrate which causes the impact detectors to vibrate and generate the electric field. The rheostats 85A-85D or electronic filters can be used to pass only electric fields above a predetermined level. In this manner, the impact detector can be used to detect impacts to the windshield and to provide a performance log on the vibration of the aircraft.

Rupture Sensor

In the following discussion, the rupture or crack detector, or sensor disclosed in U.S. Pat. No. 6,794,882, the entire disclosure of which is hereby incorporated by reference, will be used in the practice of the invention, however, as is appreciated, the invention is not limited thereto and any of the crack sensors or detectors known in the art can be used in the practice of the invention. A non-limiting embodiment of a rupture sensor or detector of the type disclosed in U.S. Pat. No. 6,794,882 is shown in FIG. 5 and designated by the number 89. The crack sensor 89 includes an electrically conductive strip 90 extending along or around substantially the entire outer periphery 38 (see FIG. 1) of a major surface of one of the sheets 22, 24, 28 and 60 of the windshield 20. In FIGS. 5 and 6, the conductive strip 90 is shown mounted over the electrically conductive layer 62 of the glass sheet 60, surrounds the bus bars 66 and 68, and electrically isolated from the conductive coating 62 by an electrically insulating layer 96, e.g. a urethane layer or an electrically non-conductive coating layer.

The conductive strip 90 is mounted on the conductive coating 62 spaced from the sides 78-81 of the sheet 60 as shown in FIG. 5. As can be appreciated, the conductive strip 90 can decrease visibility through that portion of the glass sheet over which it is deposited, and therefore, the maximum width of the conductive strip 90 depends upon the required or specified operator viewing area through the windshield 20. Aircraft transparencies, e.g. windshields have specific safety requirements specifying the viewable (or transparent) area required. However, if the conductive strip 90 is formed from a substantially or fully transparent material that still has the required conductive properties, the placement of the conductive strip 90 with respect to the sheets of the windshield would be highly variable. For example, and not limiting to the invention, the conductive strip 90 can form an inner or small strip or band more centrally located on the surfaces of the sheets. Alternatively, the conductive member 90 can include multiple and concentric strips or bands emanating from a center of the glass sheets outwardly towards the periphery 38 of the sheets 22, 24, 28 and 60. Alternatively still, the conductive strip 90 can be in the form of an "X" or other shape, depending upon the anticipated nature and course of a rupture or break in the sheets.

As discussed above, the conductive coating 62 is electrically isolated from the conductive strip 90 by an electrically insulating layer 96. As can be appreciated, the insulating layer 96 can mask the presence of a small crack in the glass sheet 32 by preventing the conductive strip 90 from separating. This limitation is eliminated by applying the conductive strip 90 on an uncoated surface portion of the glass sheet 60, e.g. and not limiting to the invention, by surrounding the coating 62 and the bus bars 66 and 68 with a strip of uncoated glass 92 (shown only in FIG. 2). The uncoated glass strip 92 can be provided in any convenient manner, e.g. by masking the glass surface during the coating process, or abrasively or chemically removing the coating from the glass surface. Because the glass is chemically strengthened it is preferred to mask the areas during the coating process to avoid surface damage that can cause the tempered glass to fracture.

As can be appreciated, the conductive strip 90 can be applied to any surface of any one of the sheets of the laminated windshield 20; however, in the preferred practice of the invention the conductive strip 90 is preferably between the sheet the uncoated portion 92 of the sheet 60 and the urethane layer 34. In the non-limiting embodiment shown in FIG. 6, the conductive strip 90 is mounted over the uncoated portion 92 of the sheet 60 (see FIG. 2) and extends around substantially the entire outer periphery of the coating layer 62. The conductive strip 90 has a first termination surface 104 and a second termination surface 106. The distance or gap between the first termination surface 104 and the second termination surface 106 should be sufficient to prevent any descriptive electrical field communication between the termination surfaces 104 and 106.

The rupture sensor 90 further includes an electrical power source 108 in electronic communication with the conductive strip 90 to apply an electrical potential to the conductive strip 90. The power source 108 can be any conventional electrical source, such as, but not limited to, a battery, an electrical generator, and the like. Further, the rupture sensor 90 includes an electrical measurement mechanism 110, such as an ohmmeter, in communication with the conductive strip 90 for measuring the electrical potential of the conductive strip 90. A control mechanism 112, such as a software and a computer, is used to control and communicate with both the electrical power source 108 and the electrical measurement mechanism 110. This control mechanism 112 can be used to command the electrical power source 108 to provide a predetermined or specifically set electrical potential to the conductive strip 89 and, after application, the control mechanism 112 can collect and/or calculate the electrical potential of the conductive strip 90 via the electrical measurement mechanism 110. All of the electrical power source 108, the electrical measurement mechanism 110 and the control mechanism 112 can be combined in a single unit or instrument, e.g. the console 88 (see FIG. 18) or can be individual units (see FIG. 5).

The electrical power source 108 applies a set voltage to the conductive strip 90, as set or specified by the control mechanism 112. This set voltage allows current to flow through the conductive strip 90. The electrical measurement mechanism 110 is connected to the conductive strip 90 through a first lead 114 and a second lead 116. The first lead 114 is connected to the first termination surface 104 and the second lead 116 is connected to the second termination surface 106. This connection allows the conductive strip 90 to act as an electrical circuit when the electrical power source 108 applies an electrical potential.

The electrical measurement mechanism 110 reads or measures the current flowing through the conductive strip 90 via the first lead 114 connected to the first termination surface 104, and the second lead 116 connected to the second termination surface 106. Since the electrical power source 108 is applying a set voltage, and the electrical measurement mechanism 110 is reading or measuring the current flowing through the conductive strip 90, the electrical measurement mechanism 110 (or the control mechanism 112) is able to calculate the resistance value of the conductive strip 89.

When a rupture or crack occurs and propagates in the glass sheet 60, it will eventually reach the conductive strip 90. As the crack begins to move through and break a section of the conductive strip 90, the resistance value calculated by either the electrical measurement mechanism 110 or the control mechanism 112 begins to increase. This resistance value increase indicates a rupture or crack in the glass sheet 60. When the crack fully traverses and breaks the conductive strip 90, the resistance value reaches infinity and indicates a serious rupture condition.

The conductive strip 90 can be a conductive coating material formed from any suitable electrically conductive material, such as a metal, metal oxide, a semi-metal, an alloy, or other composite material. The conductive strip 90 can also be opaque or transparent. Further, the conductive strip 90 can be a conductive coating material formed from a ceramic paint or electrically conductive ink. The conductive material must be a material that will crack or separate when the glass sheet cracks or must otherwise change its electrical properties in a manner that allows for detection of a change. The conductive strip 90 can be deposited on a surface of one or more of the glass sheets 22, 24, 28 and 60 through conventional thin film deposit methods or conventional thick film deposit methods; conventional adhesion manufacturing methods; screening, or other similar process. In one embodiment, the conductive member 90 is a conductive indium tin oxide coating.

The invention contemplates applying a conductive strip on more than one sheet, e.g. but not limiting to the invention, applying a conductive strip 90 on a surface of the glass sheets 22, 24, 28 and 60. As is appreciated, when a conductive strip is placed on more than one sheets, each one of the conductive strips 90 has it own electrical power source 108, or one power source is provided and is electrically connected to two or more of the conductive strips 90 and a rheostat is provided for each conductive strip 90 for controlling voltage to each of the conductive strips 90 in a manner discussed above for the impact sensors 83A-D, and discussed below for the rupture sensor. Similarly, one or multiple electrical measurement mechanisms 110 can be used to read and measure the electrical potential or current flowing through each of the conductive strips 90 on the sheets 22, 24, 28 and 60 of the windshield 20. In this manner the condition of each of the glass sheets 22, 24, 28 and 60 can be monitored.

The control mechanism 112 and/or the central or multiple dedicated electrical measurement mechanisms 110 are equipped to identify each individual conductive strip 90 on a glass sheet 22, 24, 28 and 60 and calculate the electrical potential (resistance value) for each conductive strip 90. In this manner, the vehicle operator receives an indication from the alarm mechanism 118 of the existence and extent of a rupture in each of the glass sheets 22, 24, 28 and 60 due to the breaking or bridging of the associated conductive strip 90. As can be appreciated, during a rupture condition, it typically proves difficult to decipher which glass sheet has been ruptured or cracked, and providing a conductive strip 90 on each of the sheets 22, 24, 28 and 60 allows the vehicle operator to identify the sheet that has the failure condition.

The conductive strip 90 can be embedded in the interlayers 26, and 34 between the sheets 22, 24, 28 and 60 as long as the conductive strip 90 is in contact with its respective one of the sheets 22, 24, 28 or 60 in a manner that will break or disrupt the conductive strip 90 in the event the surface of the glass sheet having the conductive strip cracks. In order to enhance identifying the rupture location on the surface, multiple conductive strips 90 can be placed in a grid or array pattern over the major surface of the sheets, or optionally an array pattern can be used adjacent the periphery 38 of the sheets as shown in FIG. 7 so as not to minimize reducing the vision area of windshield 20.

In the non-limited embodiment of the invention shown in FIG. 7, each one of sides 120-123 of glass sheet 125 has two rows 132 and 134 of conductive stripes at or adjacent margin 135 of glass sheet 125 to provide an array of conductive stripes to more definitively identify where a rupture or crack in the sheet 126 has occurred. More particularly, the first row 132 of conductive stripes includes conductive stripes 136-139 at the corners 141-144, respectively of the sheet 125, and conductive strips 146 and 147 at the sides 121 and 123, respectively of the sheet 125. With continued reference to FIG. 7, end 136A of the strip 136 is adjacent to and spaced from end 139B of the strip 139 at the side 120 of the sheet 125; end 136B of the strip 136 is spaced from and adjacent to end 146A of the strip 146, and end 146B of the strip 146 is adjacent to and spaced from end 137A of the strip 137, at the side 121 of the sheet 125; end 137B of the strip 137 is adjacent to and spaced from the end 138A of the strip 138 at the side 122; end 138B of the conductive strip 138 is adjacent to and spaced from end 147A of the strip 147, and end 147B of the strip 147 is adjacent to and spaced from end 139A of the strip 139, at the side 123, of the sheet 125.

The second row 134 of the conductive strips includes conductive strips 150-153. The conductive strip 160 extends between sides 121 and 123 of the glass sheet 125; has its end 150A adjacent to and spaced from end 151B of the strip 161, and its end 150B adjacent to and spaced from end 153A of the strip 153. The conductive strip 151 extends between sides 122 and 120 of the glass sheet 125 and has its end 151A adjacent to and spaced from end 152B of the strip 152. The conductive strip 152 extends between sides 121 and 123 of the glass sheet 125 and has its end 152A adjacent to and spaced from end 153B of the strip 153. The conductive strip 153 extends between sides 120 and 122 of the glass sheet 125 and has its end 153B adjacent to and spaced from end 152A of the strip 152.

The ends A and B of each of the strips 136-139, 146, 147 and 150-153 are individually electrically connected to the electrical power source 108 (see FIG. 5) to apply an electrical potential to the conductive strips 136-139, 146, 147 and 150-153, and to the electrical measurement mechanism 110 for measuring the electrical potential of the conductive strips 136-139, 146, 147 and 150-153. The control mechanism 112 controls and communicates with both the electrical power source 108 and the electrical measurement mechanism 110 as discussed above to command the electrical power source 108 to provide a predetermined or specifically set electrical potential to the conductive strips 136-139, 146, 147 and 150-153 and, after application, the control mechanism 112 can collect and/or calculate the electrical potential of the conductive strip 136-139, 146, 147 and 150-153 via the electrical measurement mechanism 110. All of the electrical power sources 108, the electrical measurement mechanisms 110 and the control mechanisms 112 for the conductive stripes 136-139, 146, 147 and 150-153 can be combined in a single unit or instrument, e.g. the console 88 (see FIG. 13) or can be individual units.

With continued reference to FIG. 7, the arrangement of two rows 132 and 134 each having spaced conductive strips, e.g. stripes 136-139, 146 and 147 in row 132, and the conductive stripes 150-153 in the row 134 provides for a closer approximation of the position of the crack or break in the glass sheet. More particularly and not limiting to the invention, crack 156 fractures the conductive strips 146 and 151, positioning the crack 156 in the center area of the side 121 of the sheet 125; crack 158 fractures the conductive strips 139 and 153, positioning the crack 158 in the side 123 adjacent the side 138 of the sheet 125. As can be appreciated the arrangement of the conductive strips as shown in FIG. 5 is useful, but not limited to, a study to determine if cracks are a random event or caused by stress imposed on the edges of the windshield by the design of the frame securing the windshield 20 in the body of the aircraft, Arcing Sensor or Detector The discussion is now directed to non-limiting embodiments of the invention for monitoring the performance of the heating arrangement which includes the bus bars 66, 68 and the electrically conductive member, e.g. the electrically conductive coating 62, or wires embedded in the interlayer 34 to determine the occurrence of, or a high probability of the occurrence of, arcing indicating that the windshield should be repaired, or replaced before the windshield is damaged by arcing, or before arcing occurs, respectively. Arcing of interest in the present discussion, but not limited thereto is electric arcing over a crack in the coating 62 and/or bus bars 66 and 68, and/or separation of the bus bars 66, 68 and/or coating 62. As is appreciated by those skilled in the art, impacts to the glass sheet 60 of the heatable member 32 can result in fractures in the glass sheet 60 that result in fractures in the coating 62. Further, moisture moving through the moisture barrier 36 of the windshield 20 (see FIG. 1) can cause delamination of the laminated windshield. The delamination of the windshield can result in separation of one or both of the bus bars 66 and 68 from the conductive coating, or the wires embedded in the interlayer 38. The electric arcing over cracks in the conductive coating 62 and separations between the bus bars and the coating result in spot heating which can increase sufficiently to cause the glass 60 of the heatable member 32 to fracture.

With reference to FIGS. 8 and 9 there is shown a non-limiting embodiment of another heating member of the invention identified by the number 160. The heating member 160 includes the bus bars 66 and 68 electrically connected to the conductive coating 62 on the glass sheet 60 (sheet 60 shown in FIGS. 1 and 2). As previously discussed, the voltage to the conductive member 62 is provided by current moving from the power source 72 through the wire 71 and the switch or rheostat 73, to the end 76 of the bus bar 68, through the bus bar 68 and the coating 62 to the bus bar 66, through the wire 70 at the end 75 of the bus bar 66 to the power source 72 (see also FIG. 2). With reference to FIGS. 8 and 9 as needed, arcing sensor or detector 164 includes a comparative circuit 165 having input side connected to opposite end 166 of the bus bar 68 by a wire 167, and connected to the current input wire 71, which is connected to the end 76 of the bus bar 68 (see also FIG. 2). In operation, a reference voltage is provided to the comparator circuit 165 by the wire 71 connected to the end 76 of the bus bar 68.

The electrical power flows through the wire 71 to the bus bar 68, through the conductive coating 62 to the opposite bus bar 66. A portion of the power passing through the bus bar 68 is directed by the wire 167 at the end 166 of the bus bar 68 to the comparative circuit 166. The comparator circuit 165 continuously or periodically compares the reference voltage from the wire 71 to the measured voltage of the wire 167. When the measured voltage of the wire 167 differs from the reference voltage by a predetermined amount, an output signal from wire lead 168 of the comparator 165 is generated which can terminate the power being supplied to the bus bars and/or send a status report of the performance of the heatable member 160 in a manner discussed below. More particularly, if the measured voltage from the wire 167 decreases it can be an indication that current is not moving through the bus bar 68. If the measured voltage from the wire 167 increases, it can be an indication that the current moving through the bus bar 68 has increased, possibly as a result of an increase in the resistance of the conductive coating 62, or the bus bar 66, e.g. caused by a crack in the conductive coating 62, or one or both of the bus bars 66, 68. As is appreciated the sensor 164 does not have the capability of identifying what is causing an increase or decrease in the voltage measured at the end 166 of the bus bar 68, however, an increase above a high norm value, or a decrease below a low norm value is an indication that the performance of the heatable member 160 is changing and that remedial action, e.g. discontinue the electrical power input to the heating arrangement, making a repair to the heatable member 160, or a replacing the windshield 20, should be taken. As can be appreciated, the comparative circuit 164 can be mounted in the console 88 (see FIG. 18A).

The sensor 164 is of the type disclosed in U.S. Pat. No. 4,902,875 the entire disclosure of which is hereby incorporated by reference. As is appreciated, the invention is not limited to the type of sensor disclosed in U.S. Pat. No. 4,902,875, and any sensor that measures the voltage or current of the conductive member 32 (see FIG. 2) or 160 (see FIG. 8) to indicate changes in the voltage or current passing through bus bars 66, 68 and/or conductive coating 62 of the conductive member 32 or 160 can be used in the practice of the invention.

With reference to FIGS. 8 and 10, as needed there is shown another non-limiting embodiment of a sensor designated by the number 170 that can be used can be used in the practice of the invention to measure the temperature of the conductive coating 62 and prevent over heating of the heatable member of the windshield 20. The sensor 170 is of the type disclosed in U.S. Pat. No. 4,994,650, the entire disclosure of which is hereby incorporated by reference. As is appreciated, the invention is not limited to the type of sensor disclosed in U.S. Pat. No. 4,994,650 and any sensor that measures the temperature of a conductive surface to prevent over heating of the conductive surface can be used in the practice of the invention.

The sensor 170 is an electric field detector that is electrically connected with the coating 62 to monitor the coating voltage at a predetermined location between bus bars 66 and 68. The sensor 170 is connected to a voltage comparative system 171 by way of wire 172. Although not limiting in the present invention, in the particular embodiment of the invention illustrated in FIG. 8, the position of the sensor 170 is spaced in close proximity to the bus bar 68 and is in the upper corner of the conductive member 160 so that its presence is minimized when viewing through the windshield 20. As is appreciated, the position of the sensor 170 can be selected to be at other locations between bus bars 66, 68, and can also extend into the viewing area of the windshield 20, if permissible.

With continued reference to FIGS. 8 and 10, the voltage comparator 171 is connected to the power source 72 by wire 174. In principle, when power is applied to the bus bars 66, 68, an electric field is established in the conductive coating 62 between the bus bars 66, 68. The voltage within the electric field is fairly linearly distributed such that a voltage at a particular location in the coating 62 is proportional to the physical location of that particular location relative to the bus bars. For a given location, if the applied voltage changes, the voltage at that given location will change proportionally. As a result, when a predetermined amount of change in the coating voltage is determined, it can be assumed that a current to the bus bars is discontinued or there is a reduction of current through the bus bars due to increased resistance of the bus bars. The increased resistance can be due to a discontinuity, i.e. break in the bus bar or a crack in the conductive coating. In this manner, the electric field detector 170 operates to detect a break in the bus bars and/or conductive coating by monitoring the voltage in the coating 62 at the position of the sensor 170. Although not limiting in the present invention, for the purpose of the following discussion, the current flows through the coating 62 from the bus bar 68 to the bus bar 66 so that the voltage drop within the coating 62 is from the bus bar 68 to the bus bar 66.

In the particular non-limiting embodiment illustrated in FIGS. 8 and 10, a reference voltage is provided to the comparator 171 from the power source 72 through the wire 174. The current flows through the bus bar 68, and through the coating 62 to the bus bar 66. A circuit of the comparator 171 monitors the voltage of the coating 62. The comparator 171 continuously compares the reference voltage from the power source 72 to the measured voltage of the coating 62 via the detector wire 172. When the measured voltage from the detector wire 172 differs from the reference voltage by a predetermined amount, an output signal from the comparator 171 is sent through lead 176 to the console 88. The difference in the voltage is indicative of that amount of a shift in the performance of the bus bars 66, 68 and/or coating 62, e.g. due to a break in the bus bars, a separation of the bus bars and coating, and/or a crack in the coating 62. The console 88 analysis the information received from the comparator 171 and takes appropriate action which includes but is not limited to, terminate the power input to the bus bar 68, or indicate that the performance of the coating 62 and/or bus bars 66 and/or 68 of the conductive member 160 has changed and that maintenance or repair is or will be needed to prevent arcing and associated localized overheating of the conductive member 62.

As can be appreciated, the comparator 165 (FIG. 9) and/or 171 (FIG. 10) can be included in the circuitry of the console 88, or can be individual or combined systems outside of the console 88.

Conductive Coating Temperature Sensor

Figure 11:
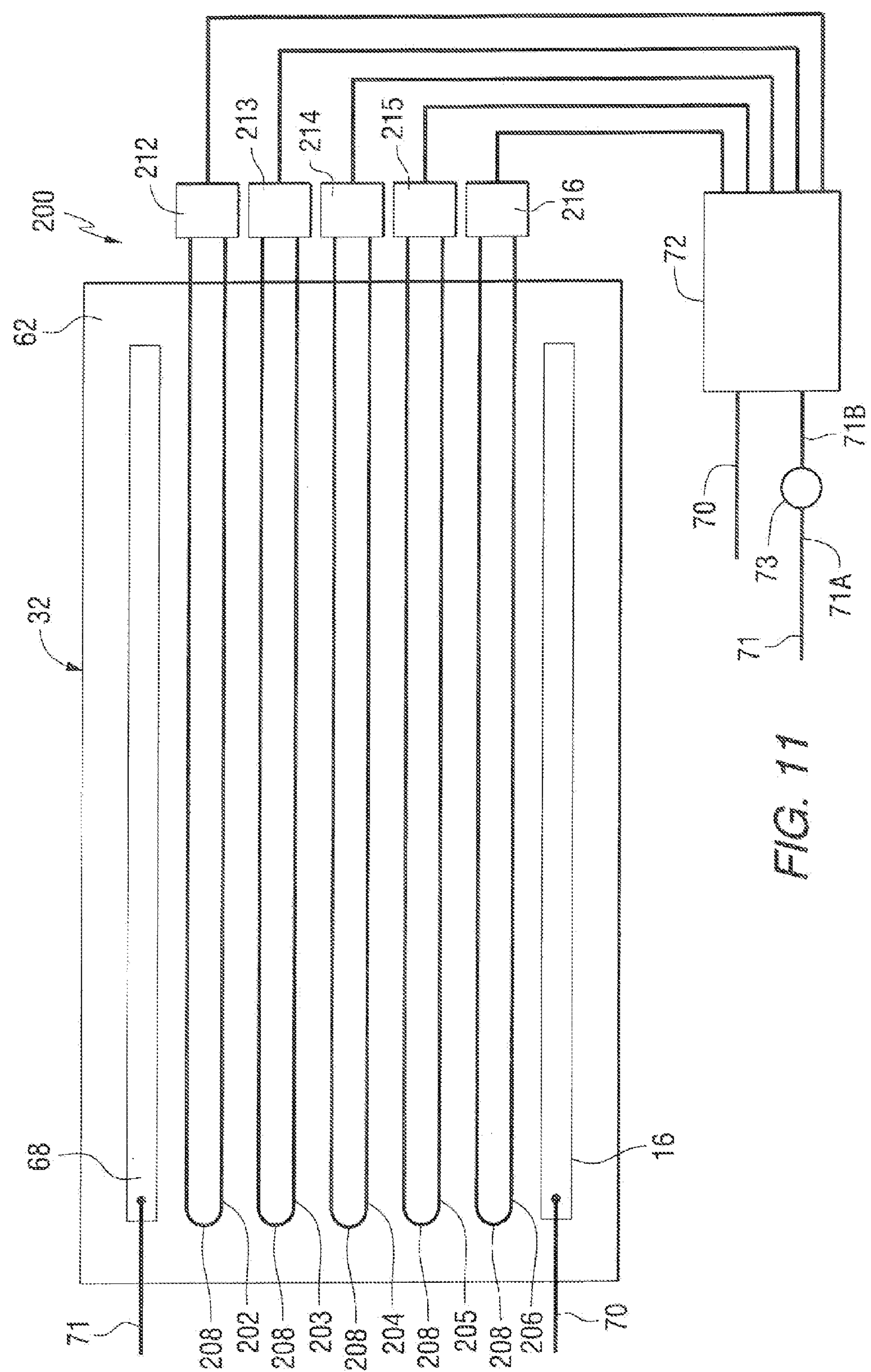
FIG. 11 is a plan view of another non-limiting embodiment of a sensor to measure the temperature of the electrically conductive member of a heating arrangement in accordance to the teachings of the invention.

With reference to FIG. 11, there is shown a sensor or detector identified by the number 200 that can be used to measure the temperature of the conductive coating 62 of the heatable member 32 to prevent over heating of the heatable member. The sensor 200 is of the type disclosed in U.S. Pat. No. 4,894,613 the entire disclosure of which is hereby incorporated by reference. As is appreciated, the invention is not limited to the type of sensor disclosed in U.S. Pat. No. 4,894,513, and any sensor that measures the temperature of an electrically conductive member can be used in the practice of the invention.

With continued reference to FIG. 11, the temperature sensor 200 of this non-limiting embodiment of the invention includes one or more wire loops, e.g. and not limiting to the invention, the sensor 200 shown in FIG. 11 has wire loops 202-206. As is appreciated, the invention is practiced with the sensor 200 having any number of wired loops. If only one wire loop is used, it preferably extends within the conductive coating 62 to a position where, based on the conductive member design and/or experience, a hot spot is anticipated. Each of the wire loops 202-206 is a resistance type device, i.e., its resistance changes as its temperature changes. Although not limiting in the present invention, the wire loops 202-206 are preferably a blackened 34 to 36 gage iron nickel wire having a resistance that changes at a rate of 0.008 ohms/foot degree centigrade (0.026 ohms/meter degree centigrade).

In the particular embodiment illustrated in FIG. 11, the wire loops extend across the conductive coating 62 between the bus bars 66 and 68, and except for the looped ends 208 of the wire loops 202-206 are generally parallel to the bus bars. The wire loops 202-206 are preferably positioned along the surface of the interlayer 34 overlaying the conductive coating 62 (see FIG. 1). The wire loops 202-206 are electrically isolated from the coating 62 so as to insulate the circuitry of the conductive member 32 from the voltage drop comparator circuit 212-216 of the temperature sensor 200 and prevent shorting of the circuit. As an alternative, the wires of the wire loops can be provided with an insulating cover or be embedded within the interlayer 34 in a similar manner as the heating wires of the AIR ON system are embedded in the interlayer 34.

With continued reference to FIG. 11, the comparator circuits 212-216 monitor the temperature of its respective one of the wire loops 202-206 based on the resistance of the wire of the wire loops which changes as the temperature of the conductive coating 62 of the heatable member 32 changes. When the average temperature of any one of the wire loops 202-206 reaches a set value, the circuit 212-216 will interrupt the power from the power supply 72 to the bus bar 68, or set an alarm or signal that the temperature of the conductive member 62 is rising and corrective action is recommended. For a detailed discussion of a circuit that can be used in the practice of the invention, but not limiting to the invention, attention is directed to U.S. Pat. No. 4,894,513.

As can now be appreciated, the comparator circuits 212-216 can be positioned in the console 88 (see FIG. 18A).

The invention also contemplates a retrofit arrangement that can be used to prevent over heating of aircraft transparencies that have heatable members, e.g. but not limited to the invention, similar to the heatable member 32. With reference to FIG. 2, in one non-limiting embodiment of the invention, a controller 230 (shown in phantom in FIG. 2) is mounted external of the windshield 20 (see FIG. 1). The controller 230 includes an ohm-meter to measures the resistance of the bus bars 66 and 68 and a comparator. When the resistance as measured by the ohm-meter exceeds a predetermined value a signal is sent by the comparator along wire 232 (shown in phantom) to open the switch 73 to stop the flow of current from the power supply 72 to the bus bars 66 and 68.

Moisture Sensor

As discussed above and as shown in FIG. 1, the windshield or transparency 20 has an outboard moisture seal 36 that is a barrier to prevent moisture from entering between the glass sheets 22, 24 and 60, and the plastic interlayers or sheets 26, 28, 30 and 34 of the windshield 20. More particularly, when the moisture seal 36 fails, e.g. cracks or de-bonds due to erosion caused by wind and rain, moisture enters between the sheets of the windshield. While the cracking or de-bonding of the moisture seal is not a structural issue, when moisture moves between the sheets, the windshield 20 can de-laminate, and/or the heating arrangement can be damaged and fail, reducing the service life of the windshield. When de-lamination of the windshield 20 occurs, the rate and amount of moisture entering between the sheets increases, accelerating the degradation of the windshield. As can be appreciated, it would be advantages to monitor the condition or performance of the moisture barrier 36, and replace or repair the moisture barrier before degradation of the windshield caused by moisture penetration begins or accelerates.

With reference to FIGS. 12-14 as needed, there is shown one non-limiting embodiment of the invention having moisture sensors 250-253 positioned on the conductive coating 62 adjacent the sides 78-81, respectively of the conductive coating 62 as shown in FIG. 12. Each of the sensors 250-253 include a layer 256 of a moisture sensitive electrically resistant material (hereinafter also referred to as "moisture sensitive layer") deposited on the conductive coating 62, and an electrically conductive layer 258 deposited over the moisture sensitive layer 256 (see FIG. 14). Each of the conductive layers 258 of each of the sensors 250-253 are individually connected to a positive pole of a DC power source, e.g. the power source 72 by way of a wire 260A-D, respectively. Optionally the wires are individually connected by way of wire 260A-D, respectively to the positive pole of the DC power source 72 through a reostate or variable transformer in a similar manner as the impact sensors 83A-D are connected to the power source 72 (see FIG. 4) to regulate the power input to each of the conductive layers 256 of the sensors 250-253. The invention is not limited to the material of the moisture sensitive layer 256 and any moisture sensitive electrically resistant material can be used in the practice of the invention, e.g. but not limited to titanium dioxide, and/or the materials disclosed in U.S. Pat. Nos. 4,621,249 and 4,793,175, the disclosures in their entirety are hereby incorporated by reference. Further the invention is not limited to the material of the electrically conductive layer 258 over the moisture sensitive layer 256 and any electrically conductive material, e.g. but not limited to aluminum, copper, gold and silver can be used. The sensors 250-253 in one non-limiting embodiment of the invention are elongated members as shown in FIG. 12 including a conductive coating 62 of indium tin oxide, a moisture sensitive layer 256 of sputtered titanium dioxide film and an electrically conductive layer 258 of sputtered gold (see FIG. 14).

As the moisture sensitive layer 256 absorbs moisture, the resistance of the moisture sensitive layer 256 decreases. As can be appreciated, the resistance of the layers 256 can be measured and/or monitored in any usual manner. In one non-limiting embodiment of the invention, wires 262A-D are connected to the conductive layers 258 of the sensors 250-253, respectively. The voltage difference between each pair of wires 260A and 262A, 260B and 262B, 260C and 262C, 260D and 262D is measured and/or monitored by comparator 270 (see FIG. 13). With reference to FIG. 13, the wire 260 of each of the sensors 250-253 is connected to comparator 270. The comparator 270 monitors the resistance of the moisture sensitive layer 256 of each one of the sensors 250-253. When the voltage difference exceeds a predetermined amount, a signal is forwarded along wire 272 to an alarm or monitor. As can now be appreciated, the comparator 270 can be positioned in or be a part of the console 88 (see FIG. 18A).

In the non-limiting embodiment of the invention shown in FIGS. 12 and 14, the positive pole (+) of a power source, e.g. but not limiting to the invention, the power source 70 (see FIG. 2) has its positive pole (+) connected to the conductive layer 258 of each of the sensors 250-253 by wire 260A-D, respectively and the negative pole (−) connected to the conductive coating 62 of the heatable member by the wire 70 connected to the bus bar 66. Adjacent ends of the layer 258 of the sensors 250-253 shown in FIG. 12 are spaced from each other a sufficient amount to prevent a current from arcing between adjacent ends of the sensors 250-253 and bus bars 66 and 68.

Figure 15:
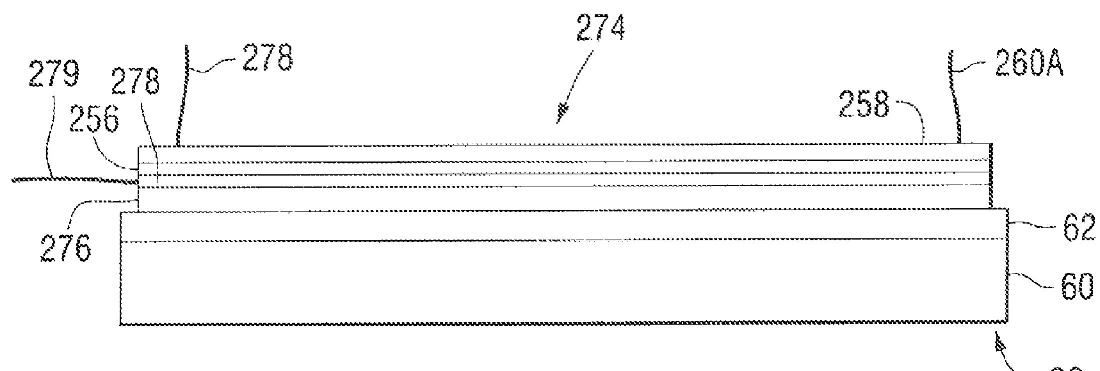
FIG. 15 is a side elevated view of another non-limiting embodiment of a moisture sensor positioned on the electrically conductive member of a heating arrangement in accordance to the teachings of the invention.

As can be appreciated, in the non-limiting embodiment of the invention shown in FIGS. 12 and 14, the sensors 250-253 are operational when current is moving through the conductive coating 62. However, in the event it is desired to have the moisture sensors operational at all times, the non-limited embodiment of the invention shown in FIG. 15 can be used. The embodiment of sensor 274 in FIG. 15 is similar to the embodiment of the sensor 251 shown in FIG. 14 except that the sensor 274 includes an electrically non-conductive layer, e.g. a plastic film 276 applied over the conductive coating 62, and an electrically conductive layer 278 similar to the layer 258 over the plastic film 278 and in electrical contact with the moisture sensitive layer 256. In the embodiment shown in FIG. 15, the wires 260A and 280 are connected to the power supply, and the wire 278 is connected to the comparator 270 (see FIG. 13).

In the event it is desired to have a moisture sensor of the invention on one or more of the sheets, e.g. but not limited to the sheet 24 of the windshield 20, and on the uncoated surface 92 of the sheet 80 (see FIG. 2), the embodiment shown in FIG. 16 can be used. The embodiment of sensor 280 shown in FIG. 16 is similar to the sensor 274 shown in FIG. 15 except that the plastic film 276 of the sensor 274 is eliminated. As shown in FIG. 16, the urethane interlayer 30 covers the glass sheet 24 and the moisture sensor 280.

Figure 17:
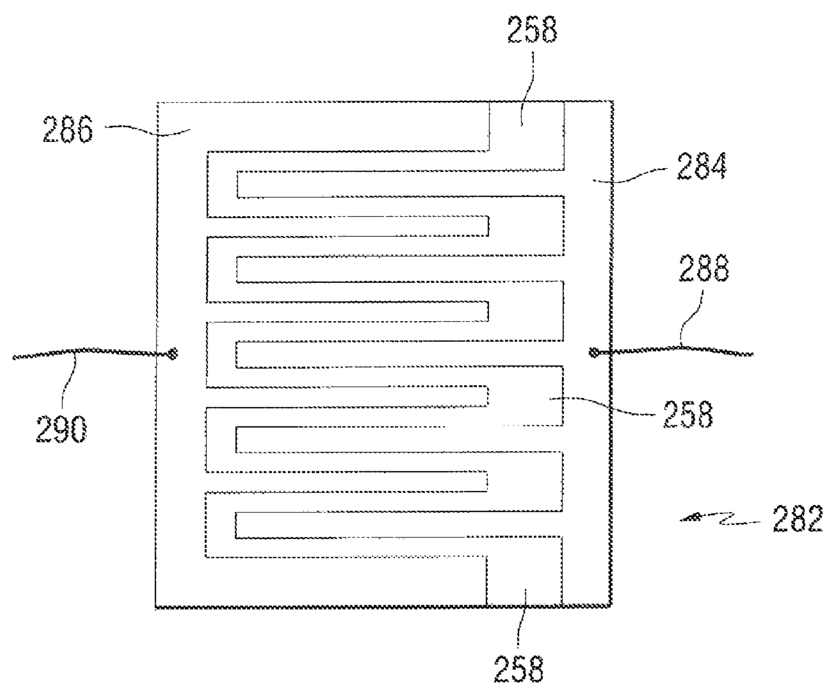
FIG. 17 is a plan view of another non-limited embodiment of a moisture sensor or detector that can be used in the practice of the invention.

Shown in FIG. 17, is another non-limiting embodiment of a moisture sensor of the invention designated by the number 282. The sensor 282 includes a pair of comb electrodes 284 and 286 electrically connected to the moisture sensitive layer 258. Wires 288 and 290 electrically connect the electrodes 284 and 286 respectively to an electrical power supply. As can now be appreciated, the invention is not limited to the design and/or construction of the moisture sensor and any of the designs and/or construction of moisture sensors known in the art, e.g. but not limited to those disclosed in U.S. Pat. Nos. 4,621,249; 4,793,175, and 5,028,906 can be used in the practice of the invention. The entire disclosures of the patents are hereby incorporated by reference.

As can be appreciated, the invention is not limited to the number or arrangement of moisture sensors or detectors positioned on the sheets 22, 24, 26, 28, 30, 34 and 60 of the windshield 20. For example and not limiting to the invention, the moisture sensor can be a single strip that extends around the margin of one or more of the sheets as shown for the conductive strip 89 of the crack sensor or detector (see FIG. 5), or the moisture sensor can be an elongated strip along each side of the sheets as shown for the moisture sensors 250-253 shown in FIG. 12, or the moisture sensors can have the arrangement shown in FIG. 7 for the conductive members 136, 137, 138, 139, 146, 147, and 150 of the crack sensor.

In another non-limiting embodiment of the invention, the moisture sensor can be used as a crack detector. More particularly, when the moisture sensor, e.g. the moisture sensor 274 shown in FIG. 15 fractures and separates, current no longer moves through the electrically conductive layers 258 and 278 (see FIG. 15) which can be an indication of a crack in the sheet 22, 24 an/or 60 associated with the moisture sensor.

Control System

With reference to FIG. 18, there is shown one non-limiting embodiment of the invention to monitor the performance of the transparency 20 of the invention and to timely schedule maintenance of, e.g. repairs to, or replacement of, transparencies, e.g. aircraft windshields that are performing outside acceptable limits. The windshield 20 of the invention can have one or more of the impact, rupture, arcing, temperature and/or moisture sensors or detectors, e.g. but not limited to the types discussed above. With reference to FIG. 18A, the wires from the sensors having signals carrying data regarding the performance of components of the windshield are connected to one part of a connector, e.g. an electrical output connector 300. The output connector 300 is not limiting to the invention and can be any of the types used in the art to provide external electrical access to an electric device embedded within a laminate. The output connector 300 is connected to an input electrical connector 302, e.g. other part of the connector, connected to the console 88 by a cable 304. In one non-limiting embodiment of the invention, the console 88 includes a computer having software to read and analyze the signals from the sensors or detectors to monitor and/or determine the performance of the components of the windshield. Monitor 306 provides visual display, and speaker 308 provides audible information regarding the performance of the windshield, and/or individual components of the windshield. The console 88 can include an alarm 310 to bring attention to the monitor 306. Placing the console 88 in the aircraft provides the personnel within the aircraft with real time performance of the windshield.

In another non-limiting embodiment of the invention, the console 88 has a wireless transmitter and receiver 312; the transmitter 312 transmits signals 314 to a transmitting tower 316. The signals 314 carry data on the performance of the windshield 20. The tower 316 transmits a signal 318 carrying the data on the performance of the windshield 20 to a satellite 320. The satellite 320 transmits a signal 322 carrying the data on the performance of the windshield to a control center 324. The data received is studied and the appropriate action to be taken is scheduled. In one non-limiting embodiment of the invention, based on the information received, personnel at the control center determine what action, if any, is needed. If action such as repairs to the windshield or replacement of the windshield, is needed, a signal 326 providing a repair schedule is transmitted to the satellite 320. The satellite 320 transmits a signal 328 having the repair schedule to the tower 316. The tower 316 transmits a signal 330 having the repair schedule to the console 88 and to a maintenance center 332 geographically close to the designated repair location (usually the next scheduled stop for the aircraft) to arrange to have all parts, equipment and personal need at the designated repair location.

In one non-limiting embodiment of the invention, if the data from the sensors indicate that the windshield 20 has to be replaced, the repair schedule can include shipment of the windshield to the next scheduled stop of the aircraft; if the windshield has to be replaced with some urgency, the repair schedule would include a change to the flight plan to land immediately and a windshield will be there, or will arrive shortly. The passengers can optionally be transferred to another plane, or wait until the repair is completed. If a repair is scheduled, and the repair can be made without removing the windshield, the repair schedule can provide for personnel and repair parts to be provided at the designated repair location.

As can be appreciated, the invention is not limited to wireless transmission of signals carrying information and the transmission can be made by and lines. Further, the signals can be transmitted between locations solely by satellite, or solely by transmission towers, and by combinations thereof.

The invention is not limited to the embodiments of the invention presented and discussed above which are presented for illustration purposes only, and the scope of the invention is only limited by the scope of the following claims and any additional claims that are added to applications having direct or indirect linage to this application.

What is claimed is:

1. A method of arranging repair or replacement of an aircraft transparency mounted in body of an aircraft, the method comprising:

mounting a sensor on the transparency to measure performance of a property of the transparency and to transmit a first signal that provides information as to the operating performance of the property of the transparency;

using data processing apparatus to receive the first signal to monitor operating performance of at least one property of the transparency and to compare the operating performance of the at least one property of the transparency to acceptable operating limits defined as relationship of operating performance to acceptable limits;

monitoring the relationship of operating performance to acceptable limits of the at least one property of the transparency;

providing the relationship of operating performance to acceptable limits to personnel within the aircraft to provide real time performance of the at least one property of the transparency;

based on the monitored relationship, scheduling repair or replacement of the transparency at a geographical area when the monitored relationship is at a predetermined monitored relationship; and forwarding the schedule to the aircraft and to a maintenance location to prepare for the repair or replacement of the transparency at the designated geographical work area when the monitored relationship is at a predetermined relationship.

2. The method according to claim 1 further comprising forwarding the first signal to a first monitoring system positioned in the aircraft, and transmitting a second signal to a second monitoring system positioned outside of the aircraft, wherein the second signal comprises information from at least one item from the group of items comprising the first signal, the acceptable operating performance of the at least one property, and combinations thereof.

3. The method according to claim 2 wherein the aircraft is a first aircraft and the second monitoring system also receives information regarding operating performance of a property of a transparency mounted in a second aircraft.

4. The method according to claim 2 wherein the scheduling repair or replacement comprises the second monitoring system monitoring the relationship of acceptable operating limits of the at least one property and the operating performance of the at least one property of the transparency to determine a time period in which repair or replacement of the transparency should be made; designating the geographical work area; arranging for the aircraft, personnel, equipment and/or parts to be available at the geographical work area.

5. The method according to claim 2 wherein the second signal is transmitted to the second monitoring system by transmitting the second signal from the aircraft to a first receiving and transmitting tower, or to a receiving and transmitting satellite, and transmitting the second signal from the receiving and transmitting tower, or receiving and transmitting satellite, to the second monitoring system.

6. The method according to claim 5 wherein forwarding the schedule comprises providing a third signal transmitting information having at least one of the items selected from the group of items comprising the time period in which the repair to, or replacement of, the transparency should be made; designating the geographic work area; arranging for the aircraft, personnel, equipment and/or parts to be available at the geographic work area to repair or replace the transparency, and transmitting the third signal from the second monitoring system to at least one of the following: the aircraft, a third monitoring system, a fourth monitoring system, and combinations thereof.

7. The method according to claim 6 wherein the third signal is transmitted from the second monitoring system to the receiving and transmitting satellite, or to a receiving and transmitting tower, and transmitted from the receiving and transmitting satellite, or transmitting and receiving tower to at least one of the following: the aircraft, the third monitoring system, the fourth monitoring system, and combinations thereof.

8. The method according to claim 6 wherein the third signal is transmitted to the third monitoring system, and further comprising acting on the information provided by the third signal to arrange for the personnel, equipment and/or parts to repair or replace the transparency to be available at the geographic work area.

9. The method according to claim 8 further comprising transmitting the third signal to the fourth monitoring system wherein the fourth monitoring system is located at the geographic work area.

10. The method according to claim 2 wherein the transparency is an aircraft laminated windshield having two or more glass and/or plastic sheets.

11. The method according to claim 10 wherein the sensor is selected from the group of a sensor for detecting moisture; a sensor for detecting impacts to, or vibration of, the windshield; a sensor for detecting a fracture in one of the sheets; a sensor for detecting electric arcing; a sensor for detecting temperature changes of an electrically conductive member, and combinations thereof, wherein the sensor is mounted on a surface of one of the sheets between first and second outer major surfaces of the transparency.

12. A system for arranging repair to, or replacement of, an aircraft transparency when a property of the transparency is operating outside of acceptable limits, wherein the transparency is mounted in body of an aircraft, the system comprising:

a sensor to monitor operating performance of a property of the transparency, and to generate a first signal providing the operating performance of the property of the transparency, first data processing apparatus mounted in the aircraft to receive the information of the first signal, to compare the operating performance of the at least one property of the transparency to the acceptable operating limits defined as relationship of operating performance to acceptable operating limit and to generate a second signal scheduling repair or replacement of the transparency at a geographical area when the operating performance as indicated by the first signal is outside of the acceptable operating limit;

a console positioned in the vehicle to receive the first and the second signals and to display the relationship of operating performance to acceptable operating to provide real time performance of the property of the transparency; and second data processing apparatus positioned outside of the aircraft to receive the first and the second signal to prepare for repair or replacement of the transparency when the monitored relationship is at the predetermined relationship.

13. The system according to claim 12 wherein the sensor is mounted on the transparency, and the first data processing apparatus receives the first signal, and the second data processing apparatus generates the second signal and receives a third signal, wherein the third signal comprises information from at least one item from of the group of items comprising the first signal, acceptable operating performance omit of the property, and combinations thereof.

14. The system according to claim 13 wherein the second data processing apparatus generates the second signal, wherein the second signal includes information selected from the group of time period in which repair or replacement of the transparency should be made; designating a geographic area to make the repair to the transparency or to replace the transparency; arranging for the aircraft, personnel, equipment and/or parts to be available at the geographic area.

15. The system according to claim 14 wherein the first data processing apparatus transmits the third signal to a receiving and transmitting tower, or to a receiving and transmitting satellite, and the receiving and transmitting tower, or the receiving and transmitting satellite transmits the third signal to the second data processing apparatus.

16. The system according to claim 15 wherein the second data processing apparatus transmits the second signal to at least one of the following: the aircraft, a third data processing apparatus, a fourth data processing apparatus, and combinations thereof.

17. The system according to claim 16 wherein the second data processing apparatus transmits the second signal to a receiving and transmitting tower, or to a receiving and transmitting satellite, and the receiving and transmitting tower, or the receiving and transmitting satellite transmits the second signal to the at least one of the following: the aircraft, the third data processing apparatus, the fourth data processing apparatus, and combinations thereof.

18. The system according to claim 12 wherein the sensor is selected from the group of a sensor for detecting moisture; a sensor for detecting impacts and vibrations; a sensor for detecting fractures; a sensor for detecting electric arcing; a sensor for measuring temperature of an electrically conductive coating, and combinations thereof.

* * * * *